Oct. 24, 1933.   C. C. ALLEN   1,931,477
LENS MARKING MACHINE
Filed Feb. 16, 1929   3 Sheets-Sheet 3
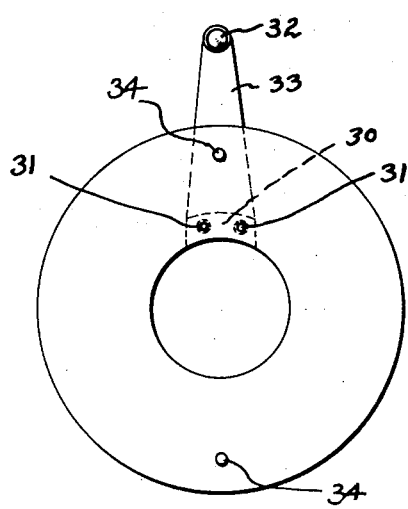
Fig. XI.
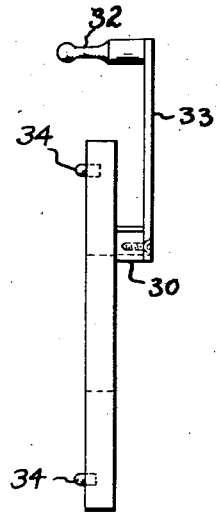
Fig. XII.
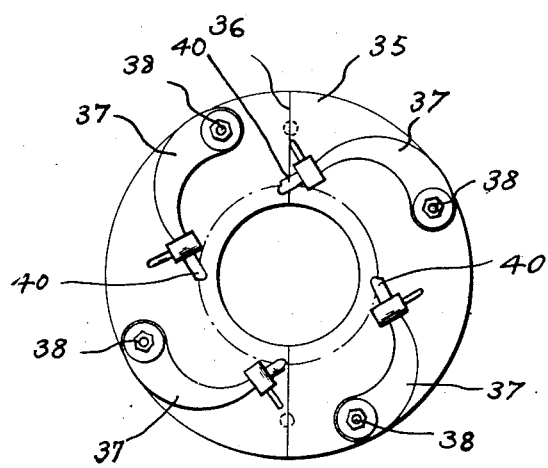
Fig. XIII.
Inventor
Clile C Allen.
By Harry H. Styll.
Attorney Patented Oct. 24, 1933

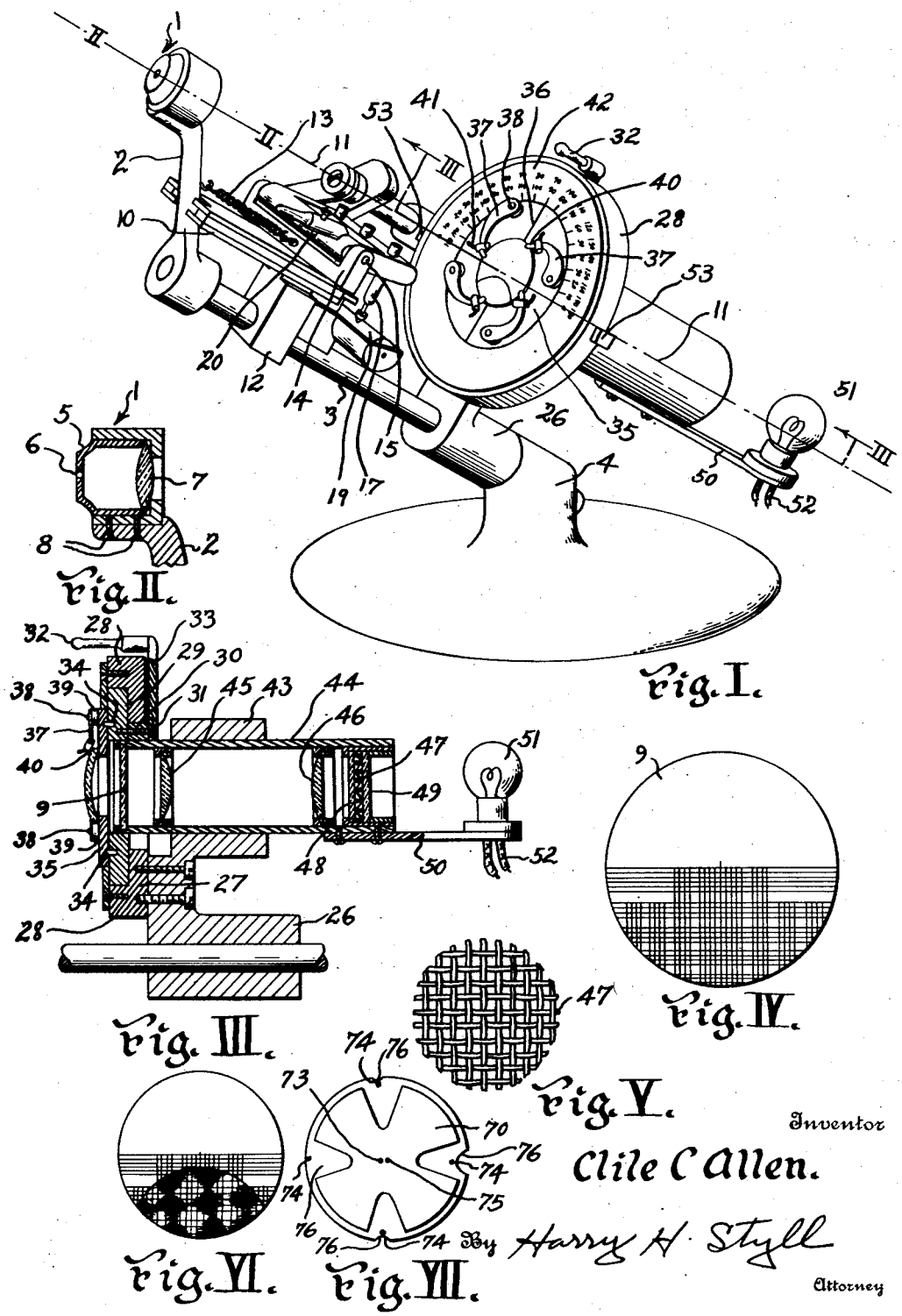

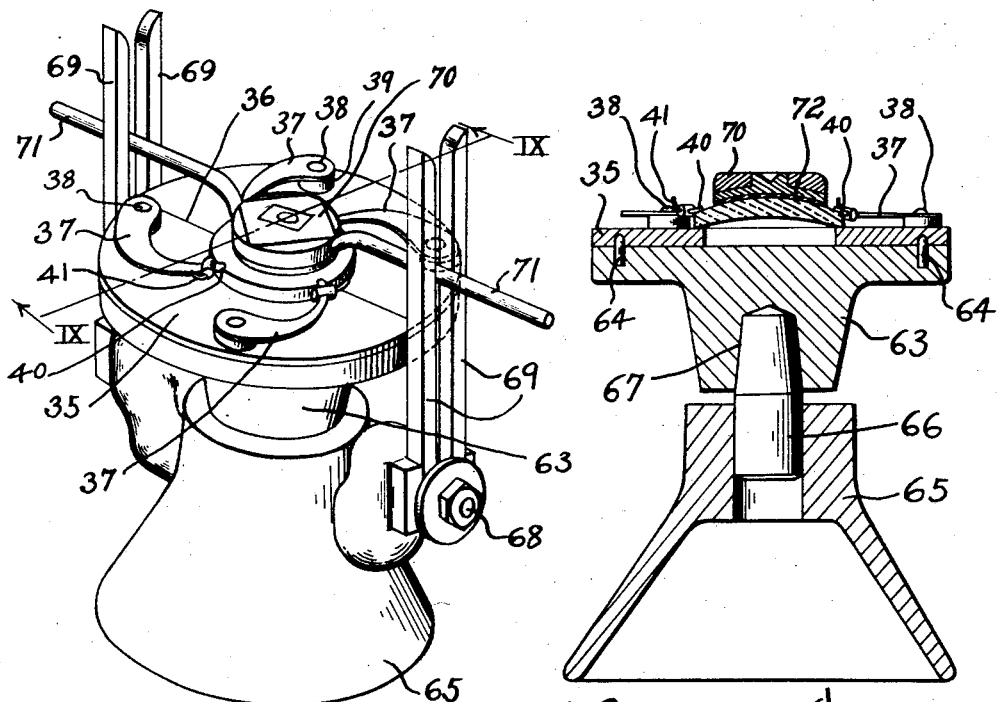
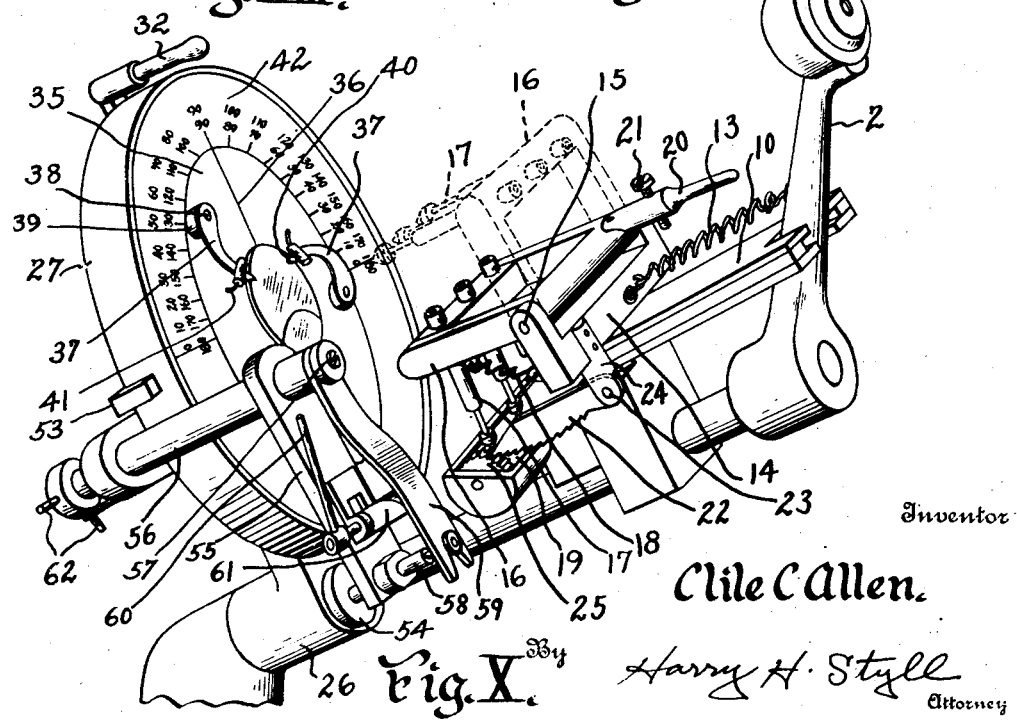

1,931,477

UNITED STATES PATENT OFFICE 1,931,477

LENS MARKING MACHINE

Clile C. Allen, Southbridge, Mass., assignor to American Optical Company, Southbridge, Mass., a voluntary association of Massachusetts Application February 16, 1929. Serial No. 340,559

12 Claims. (Cl. 88—56)

This invention relates to improvements in means for locating and registering on an ophthalmic lens certain dimensional and positional features necessary in the making of said lens to the required prescription and to a new and improved means for locating and registering said features and maintaining the alignment so found until the lens is placed within the surfacing machine that is to produce the optical surface on the lens to said prescription and to said relationships.

I have applied for the process of locating the prescriptive characteristics of a lens in my companion case Serial No. 340,558, filed February 16, 1929.

The principal object of the invention is to provide improved means for locating the positional elements of a lens to be made to prescription and means for recording these elements, together with means for transferring the lens to the lens surfacing machine without losing the alignments so found.

Another object of the invention is to provide new and improved means for marking upon the finished surface of a semi-finished lens blank, and more especially those of multifocal type, such marks as are necessary to locate calibration points for locating either an optical or geometrical center and in conjunction therewith means for designating a cylinder axis or a prism axis or both in prescribed relation to other components of the prescription, and more especially with reference to an adjacent field of a multifocal lens.

Another object of the invention is to provide new and improved means for attaching a lens holder to the lens blank so marked for finishing the second side of said lens blank with special reference to the prescribed cylinder axis.

Another object of the invention is to provide improved means for securing greater accuracy in the relation each to the other of the prescribed components of ophthalmic lenses by providing optical and mechanical means for securing this result within much smaller tolerance limits than heretofore and the consequent production of such lenses with a degree of accuracy which practically conforms to the prescription.

Another object of the invention is to provide improved means by which the dimensional and positional features for the lens may be observed and located under magnification, thereby increasing the accuracy of such determination.

Another object of the invention is to provide an improved holder for the lens blank on which the lens may be blocked for grinding without removing the lens for said blocking operation, thereby insuring the proper positioning of the lens for grinding operations without losing the alignment obtained in the locating process.

Another object of the invention is to provide an improved separable lens holder for the locating and registering device.

Another object of the invention is to provide improved means for marking the lens blank when held in position in the locating and registering device.

Another object of the invention is to provide an improved chart for locating the positional features of the lens without parallax.

Another object of the invention is to provide improved means for clamping the lens in the lens holder.

Another object of the invention is to provide improved chart and protractor means for the locating and registering device.

Another object of the invention is to provide improved means of illuminating the chart of the locating and registering device.

Another object of the invention is to provide improved means for making more visible the segment of a multifocal lens.

Another object of the invention is to provide improved means for inking the pens of the marking means of said registering and locating device.

Another object of the invention is to provide an improved process for locating the positional features of a lens for registering said features thereon and for blocking the said lens for surfacing without losing the alignments so established.

Other objects and advantages of the invention will become apparent from the following description taken in connection with the accompanying drawings, and it will be apparent that many changes may be made in the details of construction, arrangement of parts and steps of the process without departing from the spirit of the invention as expressed in the accompanying claims. I, therefore, do not wish to be limited to the exact arrangements, details of construction and steps of the process shown and described as the preferred forms only have been shown by way of illustration.

Referring to the drawings:

Fig. I is a perspective view of a device embodying the locating and recording features of the invention;

Fig. II is a cross section on line II—II of Fig. I;

Fig. III is a cross section on line III—III of Fig. I;

Fig. IV is a face view of the scale chart;

Fig. V is a front view of the test object screen;
Fig. VI shows the scale chart and the test object as seen through a multifocal lens;
Fig. VII is a face view of the edge blank showing certain calibration points with relation to the margin thereof;
Fig. VIII is a perspective view illustrating the positioning of a lens blank on the lens holder;
Fig. IX is a cross section on line IX—IX of Fig. VIII;
Fig. X is a partial perspective showing the lens holder, the lens clamp, the marking device and the eye piece;
Fig. XI is a front view of the lens holder support;
Fig XII is a side view of Fig. XI;
Fig. XIII is a front view of the lens holding means.

In the marking of semi-finished ophthalmic lens blanks it has heretofore been the usual practice for the operator to place the blank upon a protractor and to manually mark upon its finished surface the axis of such cylinder or prism as may be prescribed, together with marks at or near the blank margin for locating by calibration the lens thickness, prism axis, the position of either the optical or the geometric center, each in prescribed relation one to the other and to an adjacent field of a multifocal lens when present. The line of joinder between two adjacent fields of a multifocal lens is usually invisible when so placed upon a protractor. It has heretofore been the practice to experimentally find a location such as the margin of a lamp shade, the edge of a window or the like, where this line of joinder was visible, and to dot or otherwise mark along this line in order to identify it when placed upon the protractor, and also to place a dot at either the geometric center of such field or upon a line passing vertically through its center for the purpose of securing the prescribed difference between vertical lines passing through the respective geometric centers of two adjacent fields. In this procedure two factors serve to render impossible such uniform degree of accuracy as is necessary for accurate prescription work within a predetermined tolerance.

The first comprised the manual nature of the operations which render impossible uniform results within small tolerances by reason of varying conditions of health, mood, fatigue or the like of the operator; the second was due to the presence of parallax when the line of vision of the operator was other than perpendicular to the plane of the protractor, with the result that markings placed upon the lens blank were displaced from their correct position to an incorrect position which appeared to be correct by reason of the parallax present.

Furthermore it must be understood that the axis of a prescribed cylinder must lie at its proper angular relation to other components of the prescription and that the attachment of the lens holder to a blank marked as described must be such that the axis of the holder either coincides with or lies parallel to the prescribed cylinder axis. In the method usually employed for attaching the lens holder to the lens blank the operator manually holds the holder so that its axis lies parallel to the cylinder axis mark upon the lens blank and manually moves the holder to a position above the lens blank from whence the holder is lowered upon the blank, the operator endeavoring during this movement to maintain the parallelism of the holder and lens axis which existed before moving the holder over the lens blank. Serious errors in regard to cylinder axis constantly occur under this procedure, chiefly by reason of the lens blank and its axis marking being covered and hidden from view in placing the holder upon the blank so that the operator proceeds more by feel and guess work than otherwise.

Prior art methods were subject to error in the angular relationship of the cylinder axis to other components of the lens prescription by reason of the manual methods employed and cannot result in a uniform output of that degree of precision required in accurate prescription work. As a result a finished lens is often found upon inspection to be incorrect as to cylinder axis and an effort is made to rectify the error by reblocking and resurfacing the lens. The inevitable result of resurfacing a lens surface is loss of time and loss by breakage, grinding into the fused surface of a lens blank of the fused type or the like, which often causes loss of the lens blank and necessitates the expense of another blank, together with the expense of finishing its surface.

It is, therefore, one of the prime objects of my invention to provide means by which the positional features of the lens may be accurately located and registered upon the lens and then the lens blocked in position for surfacing without losing the alignments of the positional features so found and determined to the end that the finished lens will conform to a uniform degree of accuracy to its prescriptive requirements, which have not been obtainable in the prior art, particularly in connection with the location of the cylinder axis where a large percentage of prescription lenses in the past have been found to contain errors of considerable magnitude.

Referring to the drawings wherein similar reference characters denote corresponding parts throughout, the invention comprises a magnifying eyepiece, a marking or registering device, means for clamping the lens in position for marking, a removable lens holder which may be used for aligning the lens for blocking, a clearly discernible protractor plate, an illuminated chart system, an illuminated test object, and means for blocking the lens in aligned position.

The eyepiece 1 is carried by the arm 2 supported by the rod 3 which is attached to the base 4. The eyepiece 1 is shown in cross section in Fig. II and consists of a tube or ferrule 5 having the peep opening 6, the said ferrule being inserted in the opening in the support of the eyepiece. The inner end of the ferrule 5 carries the eyepiece lens 7. The ferrule is held in place in the support by means of the screws 8. The lens 7 of the eyepiece 1 is located at its focal length from the scale chart 9 which will be described hereafter.

The marking device comprises a slide 10 which slides back and forth substantially parallel to the optical axis 11 of the instrument, on a slideway supported on the block 12 carried by the rod 3. The slide 10 is resiliently urged towards the support 2 by the spiral spring 13. A pivot bar 14 is secured to the slide 10 and is provided with the pivots 15, one on each end of the bar 14 which pivotally connect the pen carrier 16. The pen carrier is resiliently urged by means of a spiral spring 18 to cause the pens 17 to contact with the inking pad 19. The operating arm or handle 20 is attached to the pen carrier 16 so that the pen carrier may be rotated on its pivots 15. Through the handle 20 is a set screw 21 so adjusted that when the point of the set screw comes in contact with the pivot bar 14 the pens are substantially parallel with the axis 11 of the instrument and lie substantially in the plane of that axis. Furthermore, the point of the central pen must be coincident with the axis 11.

Secured to the pivot bar 14 is a ratchet member 22 pivoted at 23 to the arm 24 secured to the pivot bar 14. A ratchet wheel 25 is mounted on the inking pad 19 axially therewith and engages the ratchet member 22. It will be seen, therefore, that when the slide 10 is reciprocated the ink pad 19 will be rotated when the slide is receded from the eye piece by means of the engagement of the ratchet 22 with the ratchet wheel 25. This rotation of the ink pad insures that the pens 17 will always engage a fresh point on the pad.

Secured to the base 4 is the bracket arm 26 to which is secured the circular support 27 shown in cross section in Fig. III. The support plate 27 is circular having its center at the axis 11 of the instrument and having an outer annular flange 28. Rotatably mounted in the annular flange 28 of the support plate 27 is the lens holder support 29 which is secured to an arcuate member 30 by means of the screws 31. The lens holder support 29 is rotated in the annular flange 28 by means of the handle 32 which has an offset portion 33 secured to the arcuate member 30. Two positioning pins 34 are located in the support 29. These two pins are diametrically arranged in a plane containing the axis 11 of the instrument.

The lens holder plate 35 is annular in shape and has openings to fit over the pins 34 by which the plate 35 may be located in position on the support 29. Preferably in line with the openings fitting over the pins 34 and on the outer surface thereof is the axis line 36. Pivotally mounted on the lens holder plate 35 are the clamp arms 37 pivoted at 38. The clamp arms 37 are of thin springy material. At the pivotal point 38 is a spacer member 39 separating the arms 37 from the plate 35. On the inner ends of the arms 37 are clip members 40 adapted to engage the outer surface and edge of the lens to be held in place on the lens holder plate 35. The arms 37 are operated by means of the handle 41 adjacent the outer ends of the arms 37. It will be noted that each of these arms is independently operated and will hold the lens on the lens holder plate 35 after it has been positioned within the limits of the supporting parts of the arms. The operation of these arms giving independent adjustment for each arm is contradistinguished from a universal jaw clamp where all of the arms operate in unison, and in which a round blank would be centrally held with respect to the axis thereof. It will be seen that the plate 35 may be removed from the plate 29 simply by pulling it off of the pins.

On the side of the support 27 facing the marking device is secured the protractor plate 42 in fixed relation to the support 27. It will be noted in Fig. I that the protractor plate is divided into degrees, one hundred and eighty degrees of the plate being divided off as shown.

On the bracket 26 is a bearing ring 43 into which is fitted a tube 44 extending through the annular support plate 27 and the lens holder support 29, the said tubular member 44 being arranged axially with the axial line 11 of the instrument. Adjacent the lens holder plate 35 is the scale chart 9 divided off as shown in Fig. IV. Within the tube to the rear of the scale chart 9 are the condensing lenses 45 and 46 whose function is to provide an even illumination over the chart 9. In the tube to the rear of the condensing lens 46 is the test object 47 which may be a piece of woven wire mesh between the two glass plates 48 and 49. One of these plates, preferably the one next to the illuminant, may be of colored glass to reduce color aberration of the lens system and of the lens being examined in the instrument. This colored lens may be placed anywhere in the system between the illuminant and the eye of the observer. The screen and test object are shown in Fig. V.

To the rear of the test object and carried by the support 50, secured to the tube 44 is the illuminant or lamp 51 connected with a source of electric power by the leads 52. This lamp should preferably be a frosted or opal glass to furnish diffused illumination. While I have described the condensing lenses 45 and 46 as condensing lenses, at the same time they function as objective lenses in projecting an image of the test object 47 to a position beyond the eyepiece 1 and behind the eye of the observer. Stops 53 are provided on the back of the annular support plate 27 to engage the section 33 of the handle 32 so that the axis mark 36 on the plate 35 will be brought into alignment with the 180 or zero marking on the protractor.

The lens is clamped against the lens holder 35 by means of the clamp 54 carried by the arm 55 pivotally supported on the arm 56 supported by the annular support plate 27. The arm 55 works about the pivot 57 so that the resilient lens contacting member 54 may engage the lens being supported on the lens holding plate 35. This plate is used only during the setting up operation. After the lens has been fixed by the arms 37 the clamp 55 may be removed and thrown out of the way. The contact member 54 is carried by a slide member 58 which engages the spring arm 59. The spring arm 59 is operated by means of the lever 60 which in turn operates the cam 61. When the lever arm 60 is thrown down substantially parallel with the arm 55 the contact 54 is withdrawn from the lens and the spring is locked in that position. When the handle 60 is withdrawn from its parallel position the spring arm 59 pushes down the contact face 54 to its operative position. The stops 62 engage a pin on the back of the plate 27 to stop the arm 55 in one position where the contact 54 is concentric with the axis of the instrument and the other to hold it in thrown-out position away from the axial line of the instrument.

After the lens has been placed in the lens holder plate 35 properly located and adjusted and marked the lens holder plate 35 with the lens in position may be removed from the instrument and placed on a supporting member 63, Fig. IX having the pins 64 fitting in the openings in the plate 35 which formerly fitted over the pins 34 in the instrument. The support 63 is carried by the supporting member 65 having the pin 66, which pin is tapered at 67 and fits into the inner side of the support 63. Pivoted to the support 65 at 68 on opposite sides of the support 65 are the parallel separated members or arms 69 which are diametrically arranged and contain the plane of the axis of the support 63. A lens holder member 70 having arms 71 is placed over the lens so that the arms 71 come between the upright support 69 causing the axis of the lens to be coincident with or parallel to the desired cylinder axis of the lens, which in turn is coincident with or parallel to the axis line 36 on the plate 35. In other words, the lens holder is positioned on the lens in the proper axial alignment by these mechanical means. The lens holder 70 is secured to the lens by means of pitch 72 or other cementitious means.

It will be seen that with the arrangement just described the lens holder may be placed centrically upon the lens blank when the lens blank occupies any position with reference to the axis 11 of the instrument, that is to say, whether the lens blank be centrically placed upon the holder plate 35 or otherwise. After the lens holder has been properly secured to the lens the holder may be placed in a lens grinding machine and the surface of the lens put on in the usual prior art manner.

Referring to Fig. VII, the lens holder 70 is shown in outline somewhat in the shape of a Maltese cross. The geometrical center of the lens blank is indicated at 75. The points 74 are the positional points which have been put on the lens in the centering device. The desired center of the finished lens is indicated at 73, which is eccentric to the point 75. The points 74 are equi-distant from the point 73. The margin of the lens blank is concentric with the point 75. In the margin of the lens blank I have cut the notches 76 simply by grinding therein on the edge of a grindstone. These notches are of a depth so that referring to the horizontal meridian the distance from the point 74 to the edge of the lens on the left hand side will be equal to the distance from the point 74 to the edge 76 on the right hand side and in the same sense in the vertical meridian. These marginal points, that is, the edge point that has been ground in, now serve as calibration points for positioning the lens center at 73. These points are also useful in determining the edge thickness, center thickness, centration or amount of prism. It is essential that these points be equi-distant from the desired central point of the lens 73.

Referring to Fig. IV, the scale chart 9 consists of a number of lines parallel to the horizontal axis and parallel to the vertical axis. These lines are spaced at such a distance relative to each other as to give a separation of one millimeter at the lens blank surface when the lens is viewed through the eyepiece.

The method of operation of the device is as follows: Grasp the handle 32 and turn it until the axis line 36 on the plate 35 is moved on the protractor chart to the desired cylinder axis. This is the cylinder axis of the prescription. Next, place the lens blank on the holder plate 35 and approximately axially with the horizontal axial line of the instrument. The lens, it will be understood, has one side finished and this finished side is on the side nearest the eyepiece and for sake of example in this particular instance I am using a multifocal or bifocal lens comprising the usual distance field and a small reading field. The illumination of the lamp 51 has previously been turned on.

Upon viewing the scale 9 through the peephole 6 of the eyepiece an image of the test object 47 will be visible as a confused image, its effect being to outline the periphery of the reading or segmental field in contrast with the major or distant field. Next, the lens is moved until the edge of the reading field is the required number of lines down from the center of the scale chart.

As shown in Fig. VI, it is three lines or three millimeters below the center, which means that the prescription calls for a distance field center three millimeters above the segment. The segment is also shown centered with respect to the central line of the scale 9 and, therefore, no inset of the reading field is shown, but if it had been prescribed it would be obtained by using the vertical lines of the scale chart.

Next, the lens blank being held in this position, the clamp arm 55 is swung over until the contact 54 is aligned with the lens in the lens holder. The handle 60 is then released so that the spring 59 will force the contact 54 against the lens holding it in place on the lens holder plate 35. Then the arms 37 are swung around so that the contacts 40 on the end thereof engage the margin of the lens, the clips 40 engaging the outer surface and the periphery of the lens. This engagement is maintained because the arms 37 exert a spring pressure to hold the clips in engagement with the lens. The lens blank being secured upon the plate 35, the handle 60 is then thrown back parallel with the arm 55 and the arm 55 is rotated about its pivot 57 to throw the lens contacting member 54 out of aligned position with the instrument. Next, move the handle 32 in either direction until the stops 53 engage the portion 33 of the handle and stop it so that the axis mark 36 on the lens holder 35 is identical with the zero 180 degree mark, i. e., in the horizontal meridian. The blank being in this position, press down on the handle 20 of the marking device, throwing up the pens 17 until they are in the plane of the axis of the instrument. Then push forward on the handle until the points of the pens 17 come in contact with and mark the lens. The inner motion of the pen points is governed by the slide 10. This marks the prescribed axis of the cylinder. Next, grasp the handle 32 and turn the lens holder plate until the axial line 36 registers with the 90 degree mark on the protractor scale. This is done to furnish a calibration axis at right angles to the cylinder axis for the purpose of centration.

Now the lens shows the mark for the cylinder axis and also at an axis of 90 degrees thereto. Next, remove the lens plate 35 from the support 27 and place it on the support 63 so that the holes on the under side of the plate 35 engage the pins 64. Next, the lens holder 70 is placed with its arms 71 between the upright 69 of the support 65 and lowered upon the lens blank to which it is cementitiously secured by the cementitious medium 72. This attachment of the lens holder to the lens blank should preferably be centric. By using this mechanical method of aligning the lens holder 70 with the lens, the lens is secured to the lens holder in proper axial alignment to assure that the prescription axis is ground thereon when it is placed in the surfacing machine and there has been no guess work in locating the center as it has been entirely automatic.

After the lens has been secured to the lens holder, the lens holder with the lens is removed from the lens clamp and positioned in the usual prior art surfacing machine where the prescription curve is ground on the blank.

From the foregoing description it will be seen that I have primarily produced a new process of blocking lenses, insuring the finished lens having the proper prescriptive value, and that I have greatly improved the prior art method of locating the positioning points of a lens blank by using a magnifying lens system with proper illumination of charts and test objects. It will be seen that I have made visible, particularly in the case of multifocal or bifocal lenses, the segmental field as contradistinguished from the distance field, which has been ordinarily invisible, and by providing calibrated marks upon my scale chart I have been able under magnification to locate the optical center of the distance field with respect to the edge of the segmental field and to inset or outset the segmental field to required dimensions. I have also provided simple and efficient means of obtaining the cardinal calibration points for my lens while it is being operated upon. It will also be seen that the positioning points so necessary in setting up a lens in proper position to be operated upon have been obtained either by optical or mechanical means, nothing being left to the judgment or the eye of the operator. This renders possible the finishing of prescription lens surfaces to a smaller tolerance than has hitherto been obtainable.

It will be particularly noted that the alignment of the lens for its positioning in the surfacing machine is maintained from the time that the aligning points have been determined until it is placed in the surfacing machine, no change having been made from the original setting of the device that located and marked these positioning features.

I have previously described the lenses 45 and 46 as objective lenses which project an image of the test object 47 to a position beyond the eyepiece 1 and behind the eye of the observer. Thus arranged the test object is invisible through the distant field of a multifocal lens while at the same time it appears visible in the reading field ranging from a shadowy or mottled appearance where the addition power of the reading field is low to a clear and distinct appearance where the addition power is sufficiently high so that light emanating from the test object shall be brought by the collective action of the lenses 45, 46 and 7 to focus on the retina of the observer. A marked contrast is thus produced between the appearance of the distant field as a clear, illuminated area and the adjacent reading field which shows a more or less distinct view of the test object, the general effect of which is to cause the reading field to appear covered by more or less shadowy markings which by contrast with the adjacent distant field which appears clear and without such markings serves to render the boundary line between such fields easily visible.

Having described my invention, I claim:

1. In a device of the character described, means for locating the positional elements of a multifocal or bifocal lens comprising a locating chart, means for supporting the lens in alignment with the locating chart, said support having means for designating the cylinder or prism axis of said lens, means to illuminate the locating chart so that it is visible through the lens, means interposed between said illuminating means and chart wherein the line of mergence of the reading and distance portions of the lens will be more pronounced or distinct when the chart is viewed through the lens and means for marking said lens to locate the position of the cylinder or prism axis.

2. In a device of the character described, means for locating the positional elements of a multifocal or bifocal lens comprising a support for a lens blank, chart means aligned with the lens blank for locating some of the desired prescriptive components of the lens, means aligned with the chart means and lens blank which when viewed through the lens blank will produce a more distinct line of mergence of the reading and distance portions of the blank to increase the accuracy of the location of said components, means for securing the lens blank to the support when in desired relation with the locating means adjacent the support and having cylinder or prism axis designations thereon whereby the cylinder or prism axis of the lens, or both, may be placed in prescribed relation to other components of the prescription and means for marking said locations on the blank.

3. In a device of the character described, means for locating the positional elements of a multifocal or bifocal lens comprising a support for a lens blank, transparent chart means aligned with the lens blank for locating some of the desired prescriptive components of the lens, means to illuminate the transparent chart, means positioned between the transparent chart and illuminating means which when viewed through the lens blank will produce a more distinct line of mergence of the reading and distance portions of the blank to increase the accuracy of the location of said components, means for securing the lens blank to the support when in desired relation with the locating means, means adjacent the support having cylinder or prism axis designations thereon whereby the cylinder or prism axis of the lens or both may be placed in prescribed relation to other components of the prescription and means for marking said locations on the blank.

4. In a device of the character described, means for locating the positional elements of a multifocal or bifocal lens comprising a transparent locating chart having position indicating means thereon, means for supporting the lens in alignment with the locating chart, illuminating means on the side of the chart opposite the support and in aligned relation with the lens and chart, and image forming means between the chart and illuminating means and in aligned relation with the lens which when viewed through the lens will render the line of mergence of the different fields of said lens more distinct and aid in increasing the accuracy of locating the positional elements of said lens relative to the indicating means on the chart.

5. In a device of the character described, means for locating the positional elements of a multifocal or bifocal lens comprising a member having a sight opening, a support having a protractor scale thereon aligned with the sight opening, a lens holder plate having indicator means thereon mounted in cooperative relation with the protractor scale and to rotate about a fixed axis relative to said scale, said plate having an opening therein and lens holding means thereon, said support having positional locating means thereon in aligned relation with the opening in the lens holder plate and on the side thereof opposite the member having the sight opening therein for locating some of the positional elements of the lens, and image forming means on said support in aligned relation with the positional locating means and on the side thereof opposite the member having the sight opening for producing an image which when viewed through the lens will render the line of mergence of the reading and distance portions of said lens more distinct so that the said lens may be more accurately located relative to the positional locating means.

6. In a device of the character described, means for locating the positional elements of a multifocal or bifocal lens comprising a member having a sight opening, a support having a protractor scale thereon aligned with the sight opening, a lens holder plate having indicator means thereon mounted in cooperative relation with the protractor scale and to rotate about a fixed axis relative to said scale, said plate having an opening therein and lens holding means thereon, said support having positional locating means thereon in aligned relation with the opening in the lens holder plate and on the side thereof opposite the member having the sight opening therein for locating some of the positional elements of the lens, image forming means on said support in aligned relation with the positional locating means and on the side thereof opposite the member having the sight opening for producing an image which when viewed through the lens will render the line of mergence of the reading and distance portions of said lens more distinct so that the said lens may be more accurately located relative to the positional locating means and illuminating means in cooperative relation with image forming means to illuminate said means.

7. In a device of the character described, means for locating the positional elements of a multifocal or bifocal lens comprising a member having a sight opening, a support having a protractor scale thereon aligned with the sight opening, a lens holder plate having indicator means thereon mounted in cooperative relation with the protractor scale and to rotate about a fixed axis relative to said scale, said plate being removable and having an opening therein and lens holding means thereon, said support having a transparent locating chart thereon in aligned relation with the opening in the lens holder plate and on the side thereof opposite the member having the sight opening for locating the positional elements of the lens, and image forming means on said support in aligned relation with the locating chart and on the side thereof opposite the member having the sight opening therein for producing an image which when viewed through the lens will render the line of mergence of the reading and distance portions of the lens more distinct so that the said lens may be more accurately located relative to the locating chart and illuminating means in aligned relation with the image forming means and on the side thereof opposite the chart for illuminating said means.

8. In a device of the character described, means for locating the positional elements of a multifocal or bifocal lens comprising means for supporting a lens blank so that the operator can sight through said blank, means aligned with the lens blank having positional locating means thereon by which the positional elements of the lens may be located on the blank by adjustment of said blank and positional locating means relative to each other, image forming means aligned with the blank on the side thereof opposite the operator which when viewed through the blank will render the line of mergence of the reading and distance portions of the blank more distinct to increase the accuracy of locating the positional elements of the lens, means mounted in predetermined relation with the lens support and movable toward said support for marking the blank while in said located position to designate the location of some of the positional elements on the lens and means for varying the axial relation of the blank and marking means without altering the location of the first positional elements of the lens and to permit the locating and marking of other of the positional elements of said lens.

9. In a device of the character described, means for locating the positional elements of a multifocal or bifocal lens comprising a locating chart member, means for supporting a lens in aligned relation with the chart member and in its adjusted position relative to said chart member for locating some of the positional elements of the lens, said support having axis indicating means thereon and means for adjusting the lens relative to said axis indicating means whereby other of the positional elements of the lens may be obtained without altering the previously located elements, and image forming means in aligned relation with the chart member on the side thereof opposite the support whereby the line of mergence of the reading and distance portions of the lens will be rendered more pronounced or distinct when viewed through the lens.

10. In a device of the character described, means for locating the positional elements of a multifocal or bifocal lens comprising a locating chart member, means for supporting a lens in aligned relation with the chart member and in its adjusted position relative to said chart member for locating some of the positional elements of the lens, said support having axis indicating means thereon and means for adjusting the lens relative to said axis indicating means whereby other of the positional elements of the lens may be obtained without altering the previously located elements, image forming means in aligned relation with the chart member on the side thereof opposite the support whereby the line of mergence of the reading and distance portions of the lens will be rendered more pronounced or distinct when viewed through the lens, and means for marking said lens to designate the positional elements thereon.

11. In a device of the character described, means for locating the positional elements of a multifocal or bifocal lens comprising means having definitely positioned lens element locating means thereon, means for supporting a lens in aligned relation with the locating means and in its adjusted position when in desired relation with said locating means for locating some of the positional elements of said lens, said support having axis indicating means thereon and means for adjusting the lens and indicating means relative to each other independently of the first named positional locating means to locate other of the positional elements of the lens without altering the previously located elements, and image forming means positioned to be visible through said lens during the locating of the positional elements thereof to render the line of mergence of the different fields of the lens more pronounced or distinct to aid in accurately locating the lens relative to the positional element locating means of the device.

12. In a device of the character described, means for locating the positional elements of a multifocal or bifocal lens comprising means having definitely positioned lens element locating means thereon, means for supporting a lens in aligned relation with the locating means and in its adjusted position when in desired relation with said locating means for locating some of the positional elements of said lens, said support having axis indicating means thereon and means for adjusting the lens and indicating means relative to each other independently of the first named positional locating means to locate other of the positional elements of the lens without altering the previously located elements, and image forming means positioned to be visible through said lens during the locating of the positional elements thereof to render the line of mergence of the different fields of the lens more pronounced or distinct to aid in accurately locating the lens relative to the positional element locating means of the device, means for illuminating the image forming means and means for marking said lens to designate the positional elements thereon.

CLILE C. ALLEN.